(12) United States Patent
Scherf et al.

(10) Patent No.: US 11,398,346 B2
(45) Date of Patent: Jul. 26, 2022

(54) MULTICOMPONENT MAGNET ASSEMBLIES FOR ELECTRICAL MACHINES

(71) Applicant: ABB Schweiz AG, Baden (CH)

(72) Inventors: Lavinia Scherf, Rheinfelden (CH); Jacim Jacimovic, Wettingen (CH); Darren Tremelling, Apex, NC (US); Lorenz Herrmann, Turgi (CH); Thomas Christen, Birmenstorf (CH); Jari Jappinen, Helsinki (FI); Taina Suontausta, Helsinki (FI)

(73) Assignee: ABB SCHWEIZ AG, Baden (CH)

( * ) Notice: Subject to any disclaimer, the term of this patent is extended or adjusted under 35 U.S.C. 154(b) by 205 days.

(21) Appl. No.: 16/903,472

(22) Filed: Jun. 17, 2020

(65) Prior Publication Data
US 2020/0312548 A1 Oct. 1, 2020

Related U.S. Application Data

(63) Continuation of application No. PCT/EP2017/083615, filed on Dec. 19, 2017.

(51) Int. Cl.
*H01F 41/02* (2006.01)
*H02K 15/03* (2006.01)

(52) U.S. Cl.
CPC ......... *H01F 41/0293* (2013.01); *H02K 15/03* (2013.01)

(58) Field of Classification Search
CPC .... H01F 41/02; H01F 1/15325; H01F 1/0578; H01F 41/0293; B23K 2103/166; B23K 1/00; B23K 1/20
See application file for complete search history.

(56) References Cited

U.S. PATENT DOCUMENTS

2010/0109468 A1 5/2010 Natsumeda et al.
2015/0099104 A1* 4/2015 Liang .................... H01F 1/0536
428/220

FOREIGN PATENT DOCUMENTS

CN 104517697 A 4/2015
CN 104575895 A 4/2015
(Continued)

OTHER PUBLICATIONS

European Patent Office, International Search Report & Written Opinion issued in corresponding Application No. PCT/EP2017/083615, dated Sep. 5, 2018, 13 pp.
(Continued)

*Primary Examiner* — Tabassom Tadayyon Eslami
(74) *Attorney, Agent, or Firm* — Greenberg Traurig, LLP

(57) ABSTRACT

A method for manufacturing a multicomponent permanent magnet, and a multicomponent permanent magnet are proposed. The multicomponent permanent magnet has a first permanent magnet having a R-T-B-composition, wherein R is at least one selected from the group consisting of Y, Ce, La, Pr, Nd, Sm, Eu and Gd and T is one or more transition metal elements including Fe; and a second permanent magnet having a R-T-B-composition, wherein R is at least one selected from the group consisting of Y, Ce, La, Pr, Nd, Sm, Eu and Gd and T is one or more transition metal elements including Fe, the second magnet including at least one of a heavy rare earth element (HRE) and an increased amount of Ce and/or Co, the second magnet having different magnetic properties, in particular a higher coercivity, than the first magnet. The first magnet and the second magnet are connected mechanically, wherein the connection is electrically conductive with an adjusted electrical resistivity.

23 Claims, 6 Drawing Sheets

(56) References Cited

FOREIGN PATENT DOCUMENTS

| CN | 105057827 | * | 11/2015 |
| CN | 105057827 A | | 11/2015 |
| CN | 103123844 B | | 3/2016 |
| CN | 103971918 B | | 1/2017 |
| CN | 106575909 A | | 4/2017 |
| CN | 107070006 A | | 8/2017 |
| EP | 0691175 A1 | | 1/1996 |
| EP | 1895636 A2 | | 3/2008 |
| EP | 2498267 | * | 9/2012 |
| WO | 2011030635 A1 | | 3/2011 |
| WO | 2013176116 A1 | | 11/2013 |
| WO | 2015183379 A1 | | 12/2015 |
| WO | 2016023961 A1 | | 2/2016 |
| WO | 2019007499 A1 | | 1/2019 |

OTHER PUBLICATIONS

China First Office Action, issued by the National Intellectual Property Administration, regarding corresponding patent application Serial No. CN201780098296.7; dated Apr. 6, 2022; 18 pages (with English Translation).

* cited by examiner

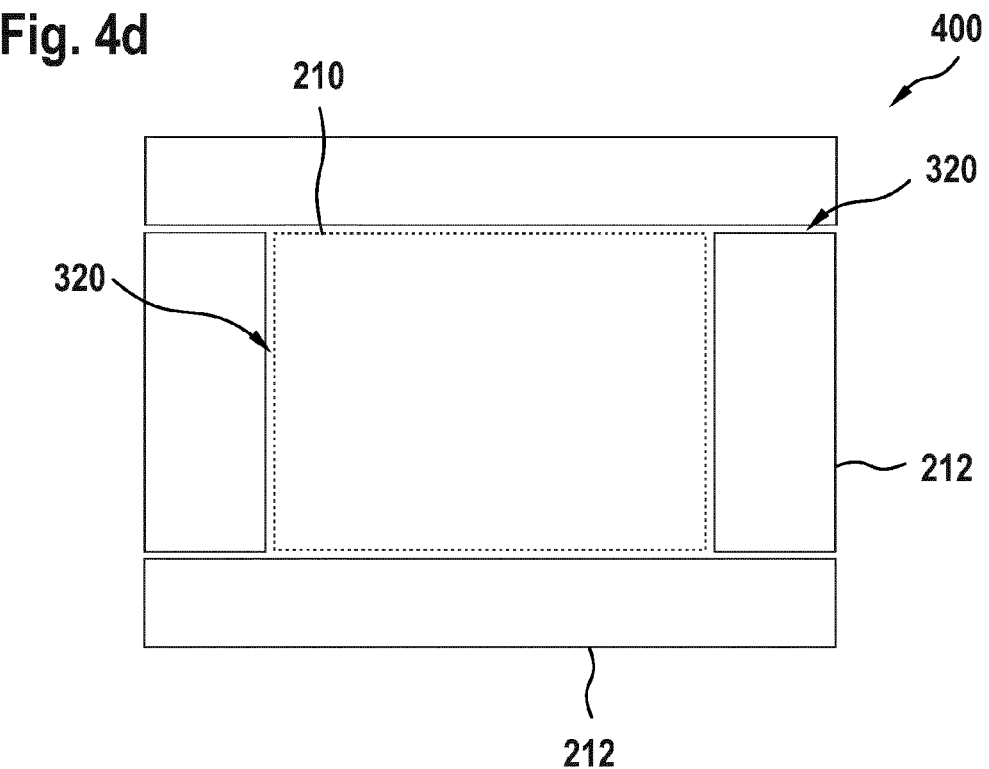
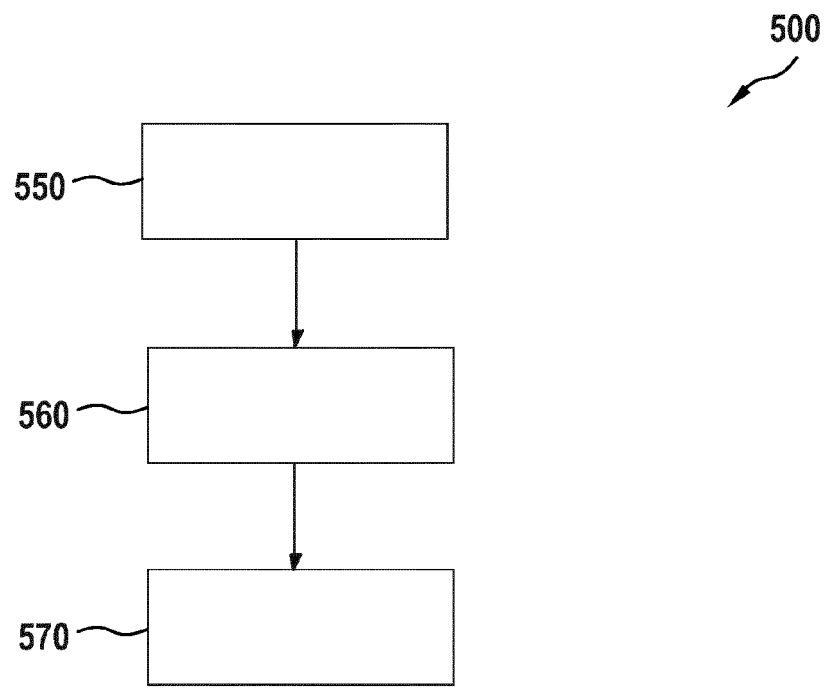

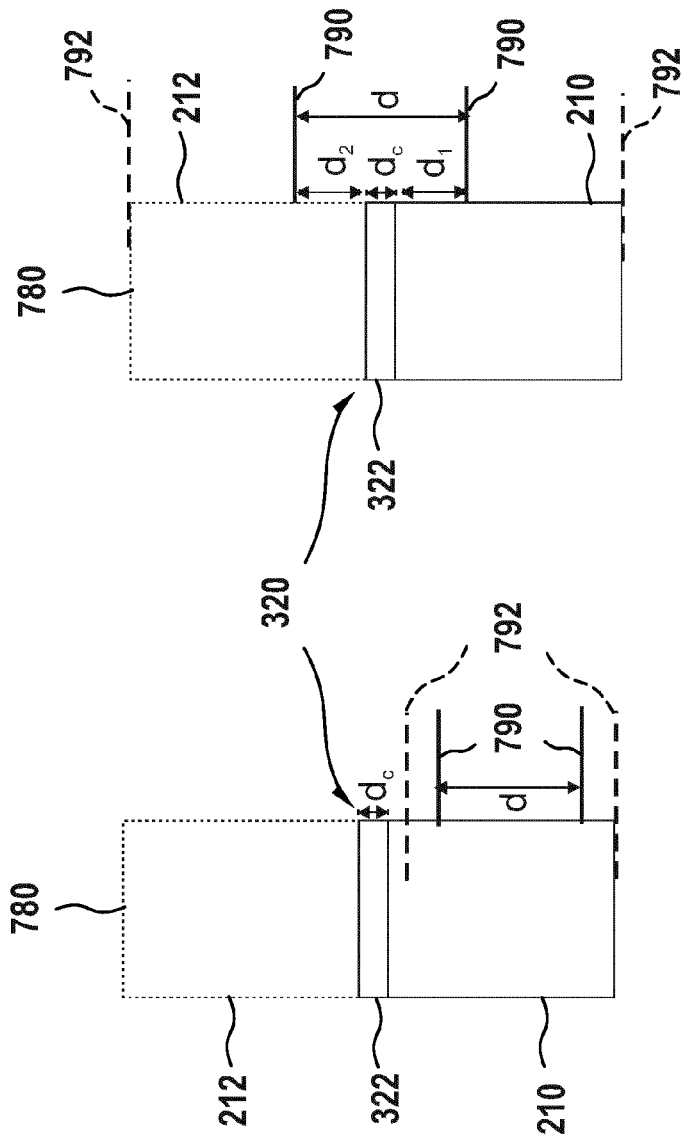

MULTICOMPONENT MAGNET ASSEMBLIES FOR ELECTRICAL MACHINES

Aspects of the invention relate to a method for manufacturing a multicomponent permanent magnet. Further aspects of the invention also relate to a multicomponent permanent magnet. The multicomponent permanent magnet in particular comprises first and second permanent magnets (magnet components), wherein the first magnet has an R-T-B composition and the second magnet has an R-T-B composition and has different magnetic properties and in particular a higher coercivity than the first magnet, e.g., due to at least one heavy rare earth element.

TECHNICAL BACKGROUND

R-T-B magnets, such as Nd—Fe—B magnets, are known as highly performant permanent magnets and have been used in various types of applications including for electrical machines such as motors or generators. One of the disadvantages of these magnets is that they lose their coercivity at high temperatures and in high magnetic stray fields occurring in extreme situations such as short circuits, causing irreversible flux loss. R-T-B magnets are herein understood to have an R-T-B composition. Herein, an R-T-B composition is defined as a composition comprising R, T and B and containing grains of a $R_2T_{14}B$ lattice structure, wherein R is at least one selected from the group consisting of Y, Ce, La, Pr, Nd, Sm, Eu and Gd and T is one or more transition metal elements including Fe. The R-T-B composition may have other elements as well, such as substituents for any one of the R, T and B, as long as these additional elements do not fundamentally change the lattice structure.

For example, in order to withstand operating conditions in electrical machines including stray fields caused by extreme events such as short circuits, Nd—Fe—B magnets are typically doped with heavy rare earth elements (HRE). The HRE are not only characterized by very high and volatile costs but also lower the remanence of the magnet and thus the achievable torque of the electric machine.

WO 2013/176116 A1 proposes an electrical machine with a permanent magnet motor that includes several standard permanent magnets with a standard shape that are arranged according to their shape in the housing of the magnet motor. To provide the desired magnetic properties, Dy or Tb is added to the permanent magnets.

However, high demagnetization temperatures are only required in relatively small, highly impacted areas of the magnets. Therefore, magnets containing multiple areas of different magnetic properties have been proposed in WO2015/183379 A1. They can provide high coercivity where needed, while providing higher remanence overall. Such multicomponent magnets can be prepared by combined sintering of different magnet powder grades, as described in WO2016/023961 A1.

These known assembly techniques produce high-performing magnets with reduced HRE amounts and desirable characteristics. On the other hand, the production of these magnets is complicated and expensive: It includes several additional processing steps that significantly increase production costs. In addition, it is difficult to produce a magnet having different grades of permanent magnet material, which typically require different processing conditions to achieve the respective optimal magnetic properties.

Thus, there is a need for permanent magnets that have at least some of the above-mentioned advantages while being easier to manufacture, and that reduce at least some of the above-mentioned other drawbacks.

SUMMARY OF THE INVENTION

In view of the above, a multicomponent permanent magnet according to claim 1, its use according to claim 16, and a method for manufacturing a multicomponent permanent magnet according to claim 17 are provided. Further advantageous aspects are mentioned in the dependent claim and in the description below.

The multicomponent magnet is assembled after the individual magnet components have been provided. The magnet nevertheless has a multicomponent structure and therefore allows for zones (first and second permanent magnet, i.e., first and second permanent magnet component or zone) having different magnetic properties. In particular, the second permanent magnet has a higher coercivity than the first permanent magnet. The higher coercivity may, for example, be achieved by the second permanent magnet comprising at least one coercivity-increasing element in a higher amount than the first magnet (e.g., more than 30 wt %, more than 50 wt % or even more than 100 wt % more than the first magnet). The at least one coercivity-increasing element may for example include at least one of a heavy rare earth element (HRE), Ce and Co. Due to the different zones, the multicomponent magnet and its magnetic properties can be adapted to the specific needs of an application, e.g., in an electric machine.

Furthermore, the multicomponent magnet can be manufactured in a controlled and cost-efficient manner. In particular, no inhomogenous portions need to be mixed and only homogenous magnet components are sintered, and therefore reproducible magnetic properties of the overall magnet are obtained. The first and second magnets are produced independently and connected thereafter to obtain the desired spatial distribution of magnetic properties. Thus, the production and especially the sintering of these magnets is simplified. In particular, the sintering and other processing conditions for each magnet component can be optimized individually if necessary. Thereby different magnetic properties enable designing various versions of multicomponent permanent magnets that all together may exhibit the desired properties.

The inventors have further found that magnet assemblies having an electrically conductive connection between individually produced magnet components (first and second permanent magnets with the electrically conductive connection therebetween being adjusted to have the claimed resistivity) have an enhanced reliability compared to multicomponent magnet assemblies with a non-conductive connection.

BRIEF DESCRIPTION OF THE FIGURES

Further details will be described in the following with reference to the figures, wherein

FIG. 4d is a schematic view of multicomponent permanent magnet with different connections according to a further embodiment;

FIG. 5 is a schematic diagram of a manufacturing method according to an embodiment of the invention;

FIGS. 7a and 7b illustrate a possible measurement of the electrical resistivity of the connection of connected magnetic components of a multicomponent magnet according to an embodiment.

GENERAL DEFINITIONS AND ASPECTS

Figure 1:
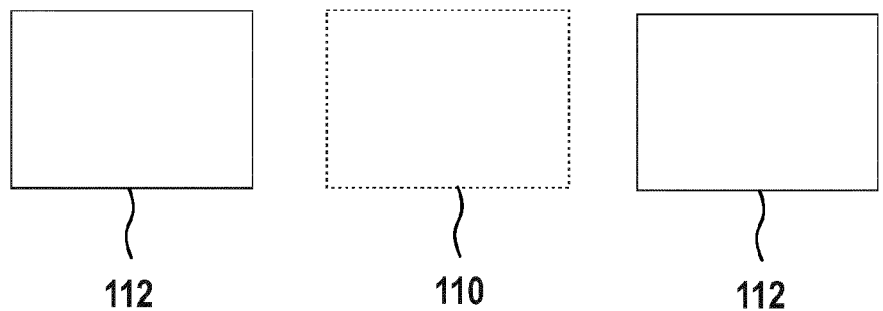
FIG. 1 is a schematic view of different permanent magnets.

Before describing individual embodiments, first some general definitions and aspects of the invention are described, which can each be combined with any other aspect or embodiment.

An electrical machine as used herein encompasses machines which convert, produce or consume electric energy. For example, the term electrical machine includes an electromechanical energy converter, such as a transformer, an electric motor, an electric generator, or an electromagnetic actuator. Further, the electrical machine as used herein may occur in the form of a rotating machine or a linear machine.

An electrical machine as used herein may include a rotor and a stator. The electrical machine as used herein preferably has magnets arranged at or in the rotor, and/or at or in the stator. The magnets are preferably arranged so that multiple magnetic poles project from the rotor and/or stator radially, axially or transversely.

A permanent magnet as used herein refers to any magnet that keeps a static magnetic field without the need of an electric flux. The permanent magnets as used herein may be produced by any suitable manufacturing process. Examples may be sintered magnets, cast magnets, injection molded magnets, extruded magnets, hot pressed magnets or magnets that are manufactured by 3D printing or spark plasma sintering.

A sintered magnet as used herein refers to a magnet which is produced by a sintering process. A sintering process is a process which includes optional compacting and forming a starting material which is a solid mass material, for example powder material, by heating and/or pressing the starting material, without fully melting it. The sintering process may be pressureless (without compacting) or include a step of applying pressure. As a result, a sintered magnet is different from a cast magnet, an injection molded magnet or an extruded magnet.

The term coercivity as used herein refers to the coercivity at operating temperatures, wherein operating temperatures typically range from −50° C. to 300° C. Insofar as the coercivity needs to be defined at a specific temperature, this temperature is room temperature. The same considerations also apply to other properties such as remanence and electrical resistivity.

DETAILED DESCRIPTION OF THE FIGURES AND OF EMBODIMENTS

Reference will now be made in detail to the various aspects and embodiments, examples of which are illustrated in the figures. Each example is provided by way of explanation and is not meant as a limitation.

For example, while the embodiments describe Nd—Fe—B magnets, also other magnets having an R-T-B-composition may be provided instead, wherein R is at least one selected from the group consisting of Y, Ce, La, Pr, Nd, Sm, Eu and Gd and T is one or more transition metal elements including Fe. Further, the coercivity of the second magnet may be increased in any manner. In the examples below, the coercivity is increased by a higher amount of Dy compared to the first magnet. Instead or in addition, the second magnet may have an increased amount of any other coercivity-increasing element in comparison to the first magnet, such as another HRE, Ce and/or Co.

Figure 2:
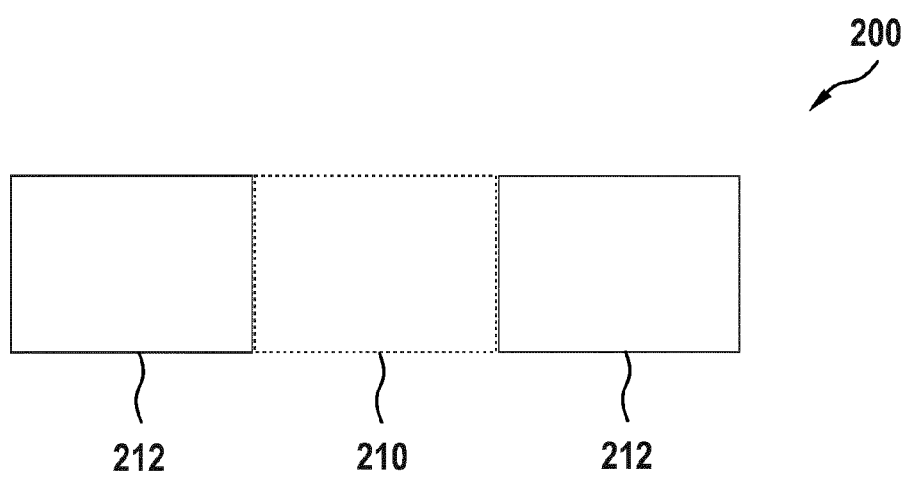
FIG. 2 is a schematic view of a multicomponent permanent magnet according to an embodiment.

With reference to FIGS. 1 and 2, the manufacture of a magnet according to a first embodiment is described. FIG. 1 shows different permanent magnets 110, 112. These permanent magnets 110, 112 are used as components for manufacturing a multicomponent magnet according to the present embodiment of the invention. The magnets provide different magnetic properties as described in detail further below.

The first magnet 110 is a permanent Nd—Fe—B magnet (i.e., a magnet with an R-T-B composition where R is Nd, T is Fe). The second magnet 112 is a permanent Nd—Fe—B magnet additionally including Dy as a heavy rare earth element (HRE) in its composition. Due to the addition of Dy, the magnetic properties of the second magnet 112 are different in comparison to the magnetic properties of the first magnet 110, and in particular the coercivity is higher.

FIG. 2 is a schematic view of a multicomponent permanent magnet 200 with two different permanent magnets 210, 212 (e.g, the magnets 110, 112 shown in FIG. 1). In this arrangement of a multicomponent magnet 200, one first magnet 210 and two second permanent magnets 212 are provided. Here, the first magnet 210 is sandwiched by the second magnets 212. It is to be understood that the number of permanent magnets and their arrangement is not limited to the number of three and to the arrangement as shown in FIG. 2. The arrangement and number of the magnets can vary, e.g., depending on the application.

The first permanent magnet 210 and the second permanent magnets 212 of the multicomponent magnet 200 are mechanically connected. As depicted in FIG. 2, the connection is established over essentially the entire area over which the respective sides of the magnets contact each other: The magnets are held together mechanically by a connection at this area (not shown). The mechanical connection is established according to any suitable joining technology, as described in more detail below. The connection is such that the microstructure of the magnet components is not significantly altered. Thus, in this embodiment, for each of the magnet components the microstructure is the same as for the magnet before the connection was established (see FIG. 1).

Further, the connection is electrically conductive. In particular, such that the bulk resistivities $\rho_m$ of the first and second permanent magnets and the electrical resistivity $\rho_c$ in the connection between the first permanent magnet and the second permanent magnet satisfy the following formula (1):

$$10^{-3}\rho_m \leq \rho_c \leq 10^5 \rho_m \qquad (1)$$

An additional or alternative formula, based on the typical value $\rho_m \approx 150$ μΩ cm of R-T-B compositions at room temperature, is the following formula (1'):

$$10^{-3} \times 150 \mu\Omega cm \leq \rho_c \leq 10^5 \times 150 \mu\Omega cm. \qquad (1')$$

An explanation of the relations (1) and (1') is given in more detail below.

Usually, the material used for the portion having a higher coercivity is more expensive than the material which is used for the portion having a lower coercivity. Hence, by applying the portion having a higher coercivity only at positions where a high coercivity is needed instead of making the whole magnet of the portion having a higher coercivity, the overall magnet costs can be decreased without any loss of performance of the magnet.

In addition, the multicomponent magnets offer simpler and cheaper processing routes towards multicomponent magnet functionality than the combined processing of e.g. different magnet powders. Coercivity enhancing HRE-rich magnets are accurately placed only where necessary and the overall consumption of HRE is much lower than in single component magnets. Furthermore, the independent processing of different magnets in the assembly solution benefits the overall magnetic properties reached in each of the first and second magnets.

Generally, multicomponent magnets according to embodiments described herein can be used to provide high coercivity where needed while retaining an overall high remanence and figure of merit.

Thus, equipping electrical machines with multicomponent magnet assemblies consisting of multiple magnets with different magnetic properties is especially useful. The different magnets are electrically and mechanically connected to each other as electromagnetic simulations show that electrically connected magnet assemblies, with a resistivity adjusted according to equation (1) or (1'), have an enhanced reliability compared to multicomponent magnet assemblies with a non-conductive connection.

Figure 3:
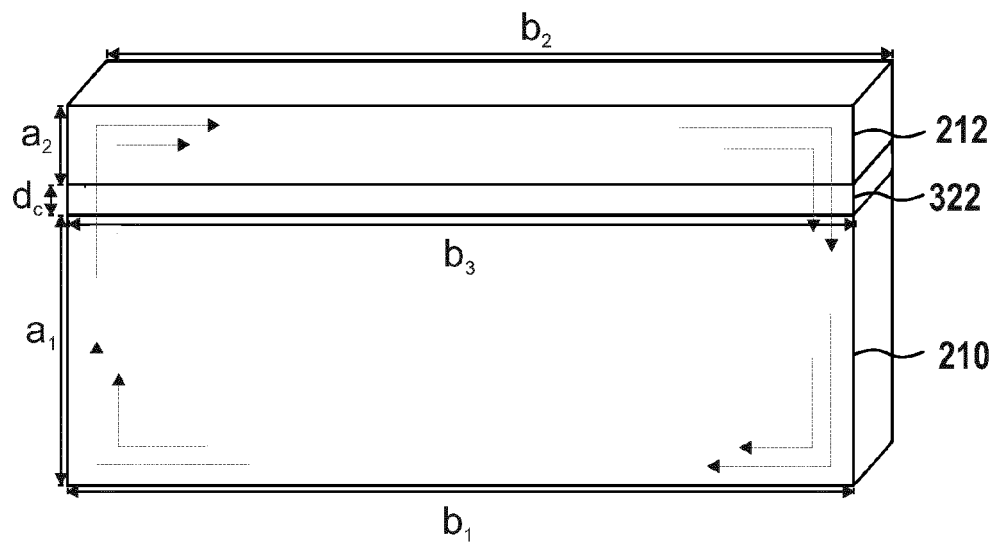
FIG. 3 is a schematic three-dimensional view of a multicomponent magnet according to a further embodiment.

FIG. 3 is a schematic view of a multicomponent permanent magnet according to an illustrative embodiment. The multicomponent magnet is formed by one first magnet 210 and one second magnet 212. The magnets 210, 212 are connected mechanically and electrically by an electrically conductive connection 322. The first magnet 210 is shown as a cuboid having the height $a_1$, and the second magnet 212 is shown as a cuboid having the height $a_2$. The electrically conductive connection 322 is shown as an interface region having the height $d_c$. Here, the height is defined as the direction in which the magnets are stacked. Both magnets and the electrically conductive connection have the same width b and the same depth c.

In the following, with reference to the simple embodiment of FIG. 3, a theory is described explaining the advantages of connecting the magnets in an electrically conductive manner and for deriving especially relevant parameters of the connection. The invention is, however, not bound by this theory. Also, it is clear that the explanation applies not only to the simple embodiment of FIG. 3 but to other configurations of the magnets and their connection as well.

When the multicomponent magnet (in the following explanation: magnet) is used in an electrical machine (say, in the rotor, although this is not essential to the invention), a voltage U is induced that causes eddy currents in the magnet due to variations in the magnetic flux of a magnet inside the electrical machine. The eddy currents I can be described by the following equation:

$$I = \frac{U}{R + j\omega L}$$

with magnet resistance R, excitation frequency ω and inductance L. In the case of a short circuit in the stator and hence dramatically increased magnetic field, these currents are expected to be dominated in most applications by high-frequency inductance and thus flow as skin currents around outer edges or outer faces of the magnet shown in FIG. 3, the outer faces or edges depending on the direction of the field.

The inventors realized that if these eddy currents can flow in a relatively unobstructed manner, the eddy currents induce a magnetic field in a direction opposed to the external magnetic field caused by the short circuit. Hence the total magnetic field strength that the magnet is exposed to is reduced, and the magnet is less prone to demagnetization.

The eddy currents therefore shield the magnet interior from demagnetization effects. Hence, it is an object to allow a relatively unobstructed flow of these eddy currents which protect the magnet from large external fields. This object is achieved by the connection 322 being electrically conductive.

In the multicomponent magnet assemblies, for certain magnetic fields the eddy current-bearing regions can coincide with those regions in which the first and second permanent magnets are connected. In order to benefit from this shielding effect, the multicomponent magnets according to aspects of the invention allow a relatively unobstructed flow of eddy currents along the edges of the multicomponent magnet. In order to achieve this, the first and second magnets are connected to each other in an electrically conductive manner, especially in those areas through which the eddy currents flow.

The skin depth δ of the eddy currents inside a multicomponent magnet can be approximated as follows:

$$\delta = \sqrt{\frac{2\rho}{\omega\mu}}$$

with the respective electrical resistivity ρ, the excitation frequency ω, and the permeability μ. The range of conductivities, in which the desired flow of eddy currents is possible, depends only on the geometry of the multicomponent magnet, the electrical resistivity of the magnet connection, and the dominant excitation frequency of demagnetization fields (a machine parameter).

Next, quantitative limits on the resistivity of the electrical connection are described. First an ideal flow of the eddy currents in an idealized situation is described. In this idealized situation, the electrical conductivities and resistivities of the entire magnet of FIG. 3 are homogenous, i.e., are the same throughout the first and second magnet as well as the magnet connection 322. In this case, the flow of the eddy currents is not disturbed by the magnet connection at all and the interior of the multicomponent magnet is effectively shielded from the demagnetization field. In addition, the skin depths of magnets and magnet connection are the same, since the relative permeabilities of the magnet connection and the magnets are both approximately 1 (when the demagnetization field H is smaller than the coercivity of the magnet).

Next, an upper resistivity limit for the electrical connection is described.

If the resistivity of the magnet connection is much higher than that of the magnets, the eddy currents cannot pass the connection layer and two separate eddy currents develop (one in each of the magnets 210, 212 of FIG. 3). In this case, the shielding effect of the eddy currents does not develop fully, especially for the smaller of the two magnets. This is the case when the magnet connection resistance dominates the overall resistance of the multicomponent magnet. Thus, the maximum resistance of the magnet connection can be defined as follows:

$$R_{c\perp} \leq R_m$$

with the resistance of the magnet connection layer 322 normal to the magnet connection, $Rc\perp$, and the resistance of the magnets 210, 212 along the eddy current path, $Rm$. Using the relationship between resistance R and electrical resistivity ρ of a conductor, $$R = \frac{\rho \cdot l}{A}$$

with the conductor length l and its cross-sectional area A, the above-mentioned resistance requirement can be formulated as:

$$\frac{\rho_c \cdot l_c}{A_c} \leq \frac{\rho_{m1} \cdot l_{m1}}{A_{m1}} + \frac{\rho_{m2} \cdot l_{m2}}{A_{m2}}$$

where m1 and m2 denote the properties of magnets 210 and 212, respectively, and c denotes the properties of the magnet connection 322.

Assuming a magnetic field from the depth direction (direction perpendicular from the image plane of FIG. 3), the eddy current will propagate in the image plane along the outer edges of the magnet as indicated by arrows in FIG. 3. The path lengths of the eddy current are related to the geometry of the multicomponent magnet of FIG. 3 as follows:

$$l_c = 2d_c$$

$$l_{m1} = 2a_1 + b$$

$$l_{m2} = 2a_2 + b$$

Here, dc is the height (thickness) of the connection layer 322; a1 and a2 are the respective heights of the first and second magnets 210, 212, and b is the (common) width of the first and second magnets 210, 212 and the connection layer 322.

The cross-sectional areas of the magnets can be expressed as the product of the respective skin depth and the multicomponent magnet thickness c (i.e. dimension perpendicular to the image plane of FIG. 3):

$$\frac{\rho_c \cdot l_c}{\delta_c \cdot c} \leq \frac{\rho_{m1} \cdot l_{m1}}{\delta_{m1} \cdot c} + \frac{\rho_{m2} \cdot l_{m2}}{\delta_{m2} \cdot c}$$

In the following it is assumed that the first and second magnets have approximately the same resistivities, $\rho_{m1} = \rho_{m2} = \rho_m$. Then, the above equation can be simplified to:

$$\frac{\rho_c \cdot l_c}{\delta_c} \leq \frac{\rho_m \cdot l_m}{\delta_m}$$

where $l_m$ is the sum of $l_{m1}$ and $l_{m2}$. For the higher resistivities of the magnet connection possible in the upper resistivity limit case, the skin depth inside the connection layer becomes larger than the dimensions of the magnet. Since the eddy currents can only flow inside the magnet, $\delta_c$ can be replaced by the magnet width b. Thus, the above equation can be rewritten to:

$$\frac{\rho_c \cdot l_c}{b} \leq \frac{\rho_m \cdot l_m}{\sqrt{\frac{2\rho_m}{\omega \mu_m}}}$$

This yields a maximum magnet connection resistance of:

$$\rho_c \leq \sqrt{\frac{\rho_m \cdot \omega \cdot \mu_m}{2}} \cdot \frac{l_m \cdot b}{l_c}$$

For an exemplary multicomponent magnet with dimensions $a_1 = 8$ cm, $a_2 = 2$ cm, $b = 10$ cm, $c = 2$ cm, and $d_c = 0.1$ mm, an electrical resistivity $\rho_m$ of 150 μΩ cm in a machine, in which the dominant excitation frequency ω is 3 kHz·2π, the following upper limit for the magnet connection resistivity follows:

$$\rho_c \leq 2.7 \cdot 10^{-2} \Omega m \approx 20000 \rho_m$$

Next, a lower resistivity limit is discussed. If the electrical resistivity of the magnet connection is too low, the eddy currents inside the magnet connection become extremely large, and the resulting losses can heat up the connection layer. This can then lead to a loss of mechanical stability of the magnet assembly and a demagnetization of magnet regions adjacent to the connection layer.

In order to avoid this, the current flowing through the connection layer Ic along the width direction should not dominate the overall current I. According to Kirchhoff's circuit laws the currents inside the multicomponent magnet are assumed to behave qualitatively as follows:

$$I_1 = I_c + I_2$$

with the currents I1 and I2 flowing along the outer edges of the first and second magnets 210 and 212, respectively. Thus, the following current requirement can be formulated:

$$I_c \leq I_2$$

With Ohm's law and assuming an approximately equal voltage, this can be rewritten as a resistance requirement:

$$R_{c\parallel} \geq R_2$$

with the resistance of the second magnet, R2, and of the magnet connection layer, $Rc\parallel$, now measured across the width direction. Using the electrical resistivities as defined above, this equation can be transformed to:

$$\frac{\rho_c \cdot b}{d_c \cdot c} \geq \frac{\rho_m \cdot (2a_2 + b)}{\delta_m \cdot c}$$

in which the denominators describe the respective cross-sectional areas. Using the expression for the skin depth derived above:

$$\frac{\rho_c \cdot b}{d_c} \geq \frac{\rho_m \cdot (2a_2 + b)}{\sqrt{\frac{2\rho_m}{\omega \mu_m}}}$$

$$\rho_c \geq \sqrt{\rho_m \cdot \omega} \cdot \sqrt{\frac{\mu_m}{2}} \cdot \frac{(2a_2 + b) \cdot d_c}{b}$$

For an exemplary multicomponent magnet with dimensions height a1=8 cm, a2=2 cm, width b=10 cm, thickness c=2 cm, and connection layer height dc=0.1 mm, an electrical resistivity ρm of 150 µΩ cm in a machine, in which the dominant excitation frequency ω to is 3 kHz·2π, the following lower limit for the magnet connection resistivity follows:

$$\rho_c \geq 1.86 \mu\Omega cm \approx 0.01 \rho_m$$

In conclusion, the border cases used for explaining the upper and lower limits of the resistivity are based on approximations to simplify the equations and calculation. However, the conclusions apply also to other magnet configurations and to other geometries.

Therefore, the explicit example of FIG. 3 allows to define reasonable electrical resistivities that the magnet connection should exhibit in other circumstances as well, in order to allow the desired flow of eddy currents. Thus, in summary, the following ranges of desirable electrical resistivities apply:

The electrical resistivity of the magnet connection (including contact resistances between the materials) should be as follows: The electrical resistivity $\rho_c$ in the connection between the first permanent magnet and the second permanent magnet should satisfy the following formula (1):

$$10^{-3}\rho_m \leq \rho_c \leq 10^5 \rho_m, \quad (1)$$

wherein $\rho_m$ is the bulk resistivity of the first and second permanent magnets (if they are different, the larger one of the two for definiteness).

The lower limit of the electrical resistivity $\rho_c$ is $10^{-2} \rho_m$, preferably $10^{-1} \rho_m$. The upper limit of the electrical resistivity $\rho_c$ is $10^4 \rho_m$, preferably $10^3 \rho_m$.

Using the above typical material parameters of the first and second magnets (typical bulk resistivity of the first and second magnets of about 150 µΩ cm at room temperature), the electrical resistivity limit at room temperature can be approximated by the following formula (1'):

$$10^{-3} \times 150 \mu\Omega cm \leq \rho_c \leq 10^5 \times 150 \mu\Omega cm. \quad (1')$$

Here, the lower limit of the electrical resistivity $\rho_c$ is $10^{-2} \times 150$ µΩ cm, preferably $10^{-1} \times 150$ µΩ cm; and the upper limit of the electrical resistivity $\rho_c$ is $10^4 \times 150$ µΩ cm, preferably $10^3 \times 150$ µΩ cm.

The above resistivity limits may apply at the entire connection 322. But, as discussed above, the resistivity limits should apply at least in a portion of the connection 322, preferably in the portion where the eddy currents are expected. Thus, the portion includes at least an outer edge portion of the electrical connection.

The multicomponent permanent magnet as described herein combines the advantages of multicomponent magnets e.g. a lower consumption of expensive HRE with a much simpler and cheaper processing route allowing optimal magnetic properties as well as accurate placement of high-coercivity regions.

Figure 4A:
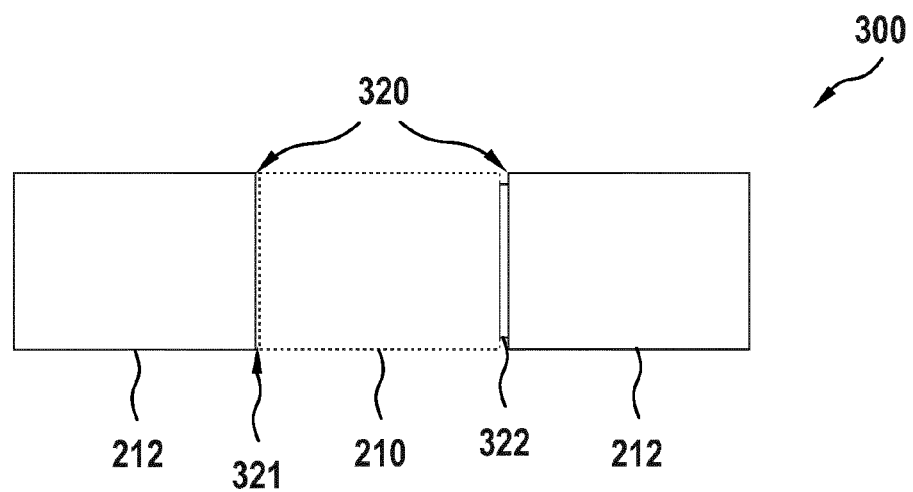
FIG. 4a is a schematic view of a multicomponent permanent magnet with a connection according to a further embodiment.

FIG. 4a is a schematic view of a multicomponent permanent magnet according to a further embodiment. The connection 320 of the multicomponent permanent magnet 300 is established by a connecting agent 322 between a first magnet 210 and a second magnet 212 (here: each of the two second magnets 212). The connection 320 is further established without the use of a connecting agent which is indicated by the arrow of reference sign 321. For example, such connection without a connecting agent may be achieved by the use of different welding applications as further described below. Here, the connecting agent 322 is an electrically conductive glue. In other examples, a soldering or brazing metal may be used as connecting agent 322 to connect the magnets. The mechanical connection 320 further enables electrical conduction between the first and the second magnets. The electrical resistivity of the magnet connection is about 150 µΩ cm whereas the layer thickness is about 100 µm. Any other resistivity within the limits described herein is possible, too.

Figure 4B:
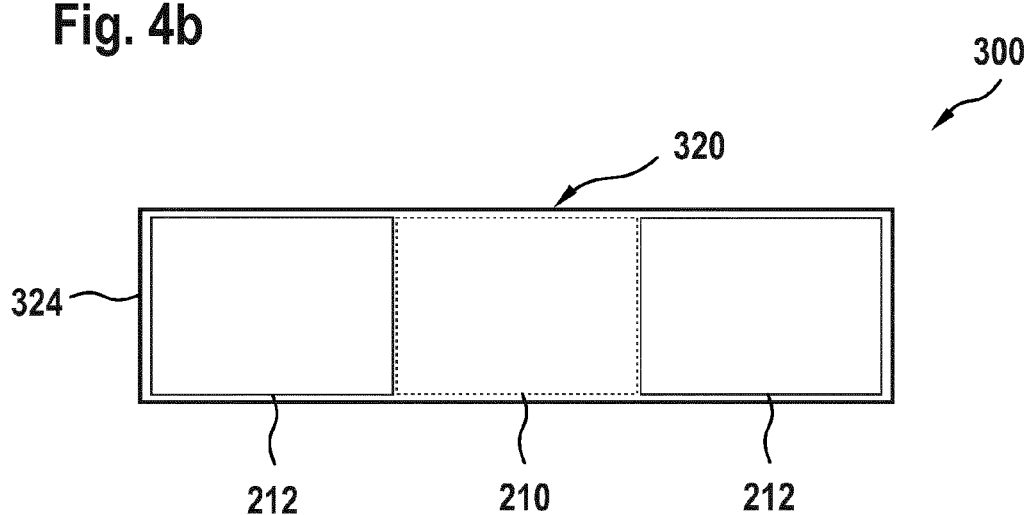
FIG. 4b is a schematic view of multicomponent permanent magnet with a connection according to a further embodiment.

FIG. 4b is a schematic view of multicomponent permanent magnet 300 with a connection 320 according to a further embodiment. The connection 320 is an external frame 324 surrounding the permanent magnets and pressing them against each other. This arrangement enables electrical conduction between the individual permanent magnets. Namely, the first and second magnets are brought in electrical contact with each other by the mechanical fixation and pressure provided by the frame 324. Optionally, a soft, electrically conductive medium such as conductive paste or a (soft) metal layer may be placed between the permanent magnets to promote the electrical contact.

Figure 4C:
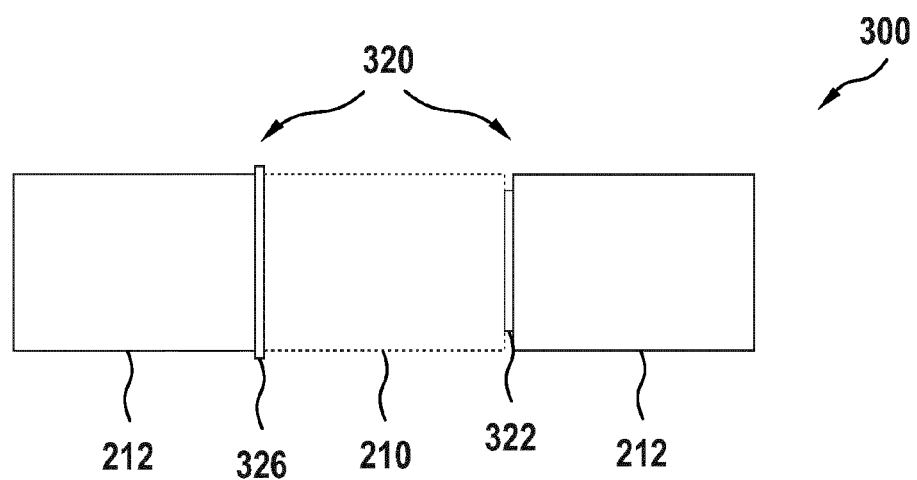
FIG. 4c is a schematic view of multicomponent permanent magnet with different connections according to a further embodiment.

FIG. 4c is a schematic view of multicomponent permanent magnet 300 with different connections according to a further embodiment. In this embodiment, different types of connection agents 322, 326 are applied between different permanent magnets to create a multicomponent permanent magnet 300. Each of these connection agents may, for example, be one of an electrically conductive paste, sheet, foil or glue. For example, an electrically conductive paste 326 is applied between a first magnet 210 and a second magnet 212 and an electrically conductive glue 322 is applied between the first magnet 210 and another second magnet 212. This embodiment can also be combined with the frame shown in FIG. 4b.

FIG. 4d is a schematic view of multicomponent permanent magnet 400 according to a further embodiment. Herein, a first magnet 210 is provided at a center of the multicomponent magnet, and plurality of second magnets 212 are provided at respective outer faces of the multicomponent magnet surrounding the first magnet 210 from multiple sides. Further, electrically conductive connections 320 are provided between the second magnets 212 and between the first and second magnets 210, 212. For the sake of clarity, reference signs are only placed at two exemplary connections of FIG. 4d. Each of the connections between the different magnets satisfies the above resistivity requirement.

FIG. 5 is a schematic diagram of a manufacturing method 500 according to an embodiment of the invention. The manufacturing method 500 comprises the following steps, in this order:

In a first step 550 a first permanent magnet having an Nd-Fe-B-composition is provided. In a second step 560, a second permanent magnet having an Nd-Fe-B-composition is provided. The second magnet additionally includes at least one heavy rare earth element (HRE). Due to the HRE, the second magnet has a higher coercivity compared to the first magnet.

In a third step 570, the first magnet and the second magnet are mechanically connected to each other. The first magnet and the second magnet are connected in such a manner that an electrical conductivity between the first magnet and the second magnet is defined by eq. (1) and/or eq. (1') mentioned herein. The mechanical connection may include, for example, the connections described in terms of FIGS. 4a to 4d and described in further detail below. These connections are established in such a manner that the microstructure of the magnet components is not significantly altered. Thereby, the optimized magnetic properties obtained during magnet production are maintained. Alternatively, the connection of the magnets may be performed together with a final annealing step of magnet production, which does alter the microstructure.

Figure 6A:
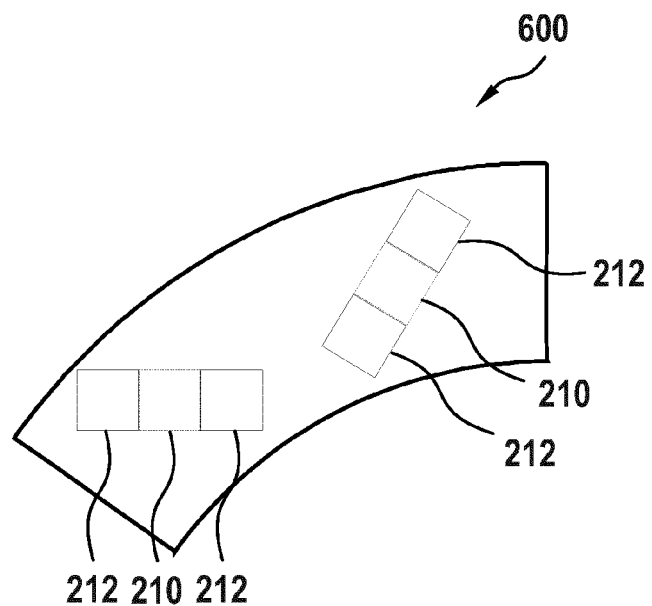
FIGS. 6a and 6b are schematic views of electrical machines comprising multicomponent magnets according to further embodiments of the invention.

FIG. 6a is a schematic view of an electrical machine 600 comprising a multicomponent magnet according to a further embodiment of the invention. An electrical machine is equipped with multicomponent permanent magnets consisting of multiple first and second magnets with different magnetic properties. The different magnets are electrically and mechanically connected to each other as described with respect to other embodiments above.

Figure 6B:
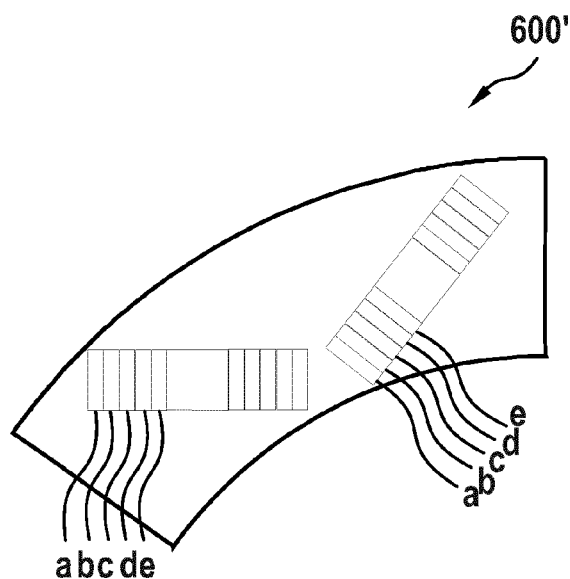

FIG. 6b is a schematic view of an electrical machine 600' comprising a multicomponent magnet according to a further embodiment of the invention. Therein, in addition to the first magnet (larger magnet in the middle) second permanent magnets e, third permanent magnets d, fourth permanent magnets c, fifth permanent magnets b and sixth permanent magnets a are provided. Each of the second to sixth permanent magnets is electrically and mechanically connected to the preceding and successive magnet, thereby forming a chain of magnets on two sides of the first magnet. Thereby, for each of the connections the description of the connection between the first and second magnets apply mutatis mutandis.

Further, the first to sixth permanent magnets have (in the order from first to sixth magnet) increasing coercivities. Thereby, a gradient-like solution is obtained, in which multiple magnets with different coercivities are attached to one another in such a manner that the coercivities of the magnets increase from the innermost to the outermost magnet (sixth magnet), so that the outermost magnet has the highest coercivity.

The multicomponent magnets of FIGS. 6a and 6b are arranged in a respective electrical machine 600, 600', more specifically in a ferromagnetic core of the electrical machine.

Next, with reference to FIGS. 7a and 7b, a possible measurement for determining the resistance and resistivity of a multicomponent magnet connection is described. This measurement may be used for determining the parameters used in eq. (1) and eq. (1'), and related parameters of the multicomponent magnet. Herein, the same setup and the same notations as defined in the above discussion of FIG. 3 are used (e.g., the lengths $l_{m1}$ and $l_{m2}$, $l_c$, $\rho_{m1}$ and $\rho_{m2}$, $\rho_c$ as defined above).

The height (thickness) of the connection region $d_c$ and thus also $l_c$ can be determined with an optical microscope from a micro section along the connection direction of the multicomponent.

The bulk resistivities $\rho_{m1}$ and $\rho_{m2}$ can be measured by standard procedures, and are also typically provided by magnets suppliers. One procedure for measuring the bulk resistivity is the four-point sensing technique as exemplarily shown for a first magnet 210 in FIG. 7a: Two current electrodes 792 are attached to the top and bottom of the first magnet and a first DC current is applied. Using two voltage electrodes 790, the voltage of the first magnet, $U_{m1}$, across a well-defined distance d is measured with an ohmmeter. The resistance of the respective portion, $R_{m1}$, can then be determined using the following equation:

$$R_{m1} = \frac{U_{m1}}{I}$$

At this point the voltage electrodes 790 should be placed sufficiently away from the current electrodes 792 in order to ensure a uniform current density. The electrical resistivity of the first magnet, $\rho_{m1}$, can then be calculated as follows:

$$\rho_{m1} = \frac{R_{m1} * A}{d}$$

with the magnet cross section A (depicted by reference sign 780 in FIGS. 7a and 7b). The electrical resistivity of the second magnets can be measured analogously.

The electrical resistivity of the magnet connection $\rho_c$, can be determined using the known resistivity of the first and the second magnets, respectively. Again, the four-point sensing method can be used as exemplarily shown in FIG. 7b: For example, the current electrodes 792 are attached at the top and bottom of the multicomponent magnet and a suitable DC current is applied. The voltage electrodes 790 are placed at a short distance above and below the magnet connection at a well-defined distance d. This precise distance d may be ensured by a mechanically fixed setup. In addition, the distances between the voltage electrodes and the connection, $d_1$ and $d_2$, and the thickness of the connection layer are determined precisely. The total electrical resistance of the multicomponent magnet across distance d, $R_{tot}$, can be determined by measuring the voltage with an ohmmeter. It is to be understood that the electrical resistivity for each connection between first and second, first and first and/or second and second magnets may be determined according to the above described method.

Since the setup represents a series of resistors, the following equation is valid:

$$R_{tot} = R_1 + R_2 + R_c$$

with $R_1$ and $R_2$ being the resistances of the first and second magnets across the distances $d_1$ and $d_2$, and $R_c$ being the resistance of the connection layer. Using the equations $$R_1 = \frac{\rho_{m1} * d_1}{A}$$

and $$R_2 = \frac{\rho_{m2} * d_2}{A}$$

to calculate R1 and R2, the desired electrical resistivity of the magnet connection can be determined as follows:

$$\rho_c = \frac{(R_{tot} - R_1 - R_2) * A}{d_c}$$

The method can also be applied for other geometries, for example, by cutting the multicomponent magnet into partitions having the geometry shown in FIGS. 7a and 7b.

General Preferred Aspects of the Invention

Next, some preferred (i.e., optional) additional aspects and details regarding the materials, process steps and parameters and the resulting multicomponent magnet are described in more detail. These aspects illustrate preferred modes of the invention, without the invention being limited to these aspects. It is understood that each aspect can be combined with any other aspect or embodiment described herein, unless stated otherwise. The present invention encompasses any such combinations.

First, aspects relating to the first and second permanent magnets are described.

According to an aspect, the first and second permanent magnets may be provided as respective R-T-B compositions, wherein R is at least one selected from the group consisting of Y, Ce, La, Pr, Nd, Sm, Eu and Gd and T is one or more transition metal elements including Fe. One example for such an R-T-B-composition is an Nd—Fe—B composition. Herein, an R-T-B composition is defined as a composition comprising R, T and B and containing grains of a $R_2T_{14}B$ lattice structure. Thus, the composition may include other elements such as additives, as long as a $R_2T_{14}B$ lattice structure is kept. For example, these additives may be selected from the group of Cu, Nb, Zr, Al, Ga, Si but are not limited thereto.

According to an aspect, the R-T-B-composition includes or consists of R: 25.0 to 37.0 wt %, B: 0.5 to 2.0 wt %, and a remainder of T, additives and impurities.

According to a further aspect, the first and/or second magnet may comprise an alloy comprising at least one composition of elements a) to l) selected from group I and, optionally, at least one element selected from group II. Herein, group I has the following elements: a) Al, Ni and Co; b) Sm and Co; c) Sm and Fe; d) Sm, Fe and N; e) Fe and N; f) Mn, Al and C; g) Mn and Bi; h) hard ferrite; i) Fe, B, and at least one rare earth element; j) Fe, C, and at least one rare earth element; k) Nd, Fe and B; l) Nd, Fe, B, and at least one rare earth element. Group II has the following elements: Al, Co, Cu, Ga, Nb, Ti, Zr, and at least one light rare earth element.

In general, shapes and chemical compositions of individual first and second magnets may be selected according to the desired spatial distribution of magnetic properties in the magnet assembly.

According to a further aspect, the first magnet may comprise a magnetic powder that is uncoated and/or is free of any HRE-containing coating. According to a further aspect, the first magnet may include an eutectic or near-eutectic alloy. According to one aspect, the first magnet may essentially be free of heavy rare earth element (HRE).

According to a further aspect, the second magnet comprises HRE. For example, the HRE may be Dy, Tb, or a combination thereof. The total content of at least one heavy rare earth element (HRE) in the second magnet may for example range from 0.1 to 15 mass %, particularly 0.5 to 12 mass %, more particularly between 1 to 10 mass %.

According to a further aspect, the second magnet is produced by a grain boundary diffusion process as described in application PCT/EP2017/066794.

According to a further aspect, the second magnets comprise a HRE containing metal or oxide such as a metal alloy. Examples with as the HRE include DyNiAl, NdDyCu, DyCu alloy, $Dy_2O_3$, $DyF_3$, $DyH_x$. Some or all of the Dy of these examples may be substituted by another HRE, in particular by Tb. According to a further aspect, the second magnets may comprise an alloy having a eutectic or near-eutectic composition (e.g. with all elements within 2 wt % from the eutectic composition). Examples of suitable eutectic alloys are a Dy—Ni—Al eutectic alloy ($Dy_{73}Ni_{9.5}Al_{17.5}$) and a Nd—Dy—Cu eutectic alloy ($Nd_{60}Dy_{20}Cu_{20}$).

The different magnetic properties of the first and second magnets include coercivity and optionally also remanence. The coercivity of the second magnet is preferably higher than the coercivity of the first magnet, preferably by at least 10 kA/m, more preferably by at least 50 kA/m. Thus, the assembled multicomponent magnet may consist of HRE-rich magnets in regions where high coercivity is required and of HRE-free magnets in less impacted regions. In other words, individual magnets are freely assembled so that high coercivity is provided where high demagnetization resistances are required. The different magnet components lead to a better performance of the assembled magnet since each of the components provides optimal magnetic properties.

According to a further aspect, the first and/or second magnet has substantially homogenous macroscopic properties (such as density, elemental composition, coercivity), not only when averaged over large distances but also when averaged over smaller distances. For example, the magnet has substantially homogenous macroscopic properties already when these properties are averaged on a scale of 2 mm and preferably on a scale of 500 µm. Herein, "substantially homogenous" means a deviation of less than 30%, preferably by less than 10% or even by less than 5%.

According to a further aspect, the permanent magnets may be manufactured by several methods known in the art, in particular by sintering, hot pressing, spark plasma sintering and/or 3D printing. The geometry of each magnet is not limited to a square as exemplarily shown in FIG. 1 but may vary depending on the application of the magnet and the geometry of surrounding elements. According to a further aspect, the magnet is producible by the method described herein.

Next, aspects relating to the arrangement of the first and second magnets is described.

According to an aspect, the first and second magnets may be arranged with respect to their magnetic properties. For example, the first and second magnets may be arranged next to each other and contacting each other at one surface. Further, second magnets may surround the first magnets. According to an aspect, the first magnet may be arranged at a center portion of the multicomponent magnet, and the second magnet(s) may be arranged at an outside of the first magnet, preferably at several different sides of the first magnet including at least a pair of opposite sides of the first magnet. Additionally or alternatively, the first and second magnets may be arranged in an alternating manner.

The first and second magnets may be arranged according to the magnetic properties needed in the intended application. For example, as also described above, to provide a higher coercivity at specific areas, second magnets may be arranged at the multicomponent magnet surface.

According to an aspect, the first and second magnets may be arranged such that their magnetic axes are aligned with each other.

According to a further aspect, the multicomponent magnet may comprise further magnet(s), e.g., a third permanent magnet, and optionally a fourth, fifth, etc. magnets. The total number of magnets may be at least three, at least five or at least seven. All of these magnets may have an R-T-B-composition. According to an aspect, the higher-numbered magnet(s) have a higher coercivity than the lower-numbered magnet(s), e.g., the third magnet has a higher coercivity than the second magnet.

Further, each of the permanent magnets may be electrically and mechanically connected to the preceding and successive magnet (insofar as present), thereby forming a chain or series of magnets from the first to the uppermost magnet. The series may extend from one side of the first magnet, or two series may extend from two opposite sides of the first magnet sandwiching the first magnet. The description of the electrical and mechanical connection between the first and second magnets herein (e.g., in the following section) apply mutatis mutandis also for these further connections.

Next, aspects relating to the connection of the first and second magnets is described.

According to an aspect, the connection of the first and second magnets is electrically conductive and has the adjusted electrical resistivity in at least some portion (area) of the connection. The area may include at least an edge portion, preferably the entire edge portion of the multicomponent magnet. According to an aspect, the connection of the first and second magnets is electrically conductive and has the adjusted electrical resistivity in the entire connection (entire area of the connection).

Herein, the resistivity $\rho_c$ is defined as the total resistivity of the interface, i.e., a combination of contact/interface resistivity and potentially a (bulk) material resistivity of the interface material in the interface layer.

According to an aspect, the thickness of the connection is at least 10 μm and/or at most 1 mm.

According to an aspect, the connection of the different magnets (first and second magnets) may be performed with or without a conductive connection material by a mechanical method or any suitable joining technology. Further, the connection may bear shear strengths of at least 500 psi, preferably of 1000 psi or even higher.

The connection may be widespread over essentially the entire area of one side of each of the magnets to be connected and/or over the common area at which the first and second magnets contact each other (at least 50%, preferably at least 80% or even at least 90% of the common area). Alternatively, the connection may partly cover sections of the permanent magnets and/or of the common area. For example, only selective areas are connected mechanically and/or electrically. Further, the connection between the first and the second magnets may include electrically conductive areas and non-conductive areas.

According to a further aspect, the connection between the first and second magnets may be stable up to a maximum temperature of at least 180° C. The connection of the magnets may be performed after full processing of the individual magnets or it may be combined with the final annealing step of magnet production.

According to an aspect, the connection may be any suitable mechanical and electrical connection. For example, the connection may be achieved by using an electrically conductive paste, sheet, a foil and/or glue or connections thereof. Further, the connection may be achieved by any suitable technique. For example, the connection may be achieved by various techniques including welding, gluing, brazing and/or soldering.

For example, the welding may include the process of cold-press welding as exemplarily described in CN 105057827 A, EP 0691175 B1 or CN103971918B.

According to an aspect, no liquid or molten phase is present in the joint. High pressure is applied below a recrystallization temperature of the single components. To provide electrical conductive properties of the welded connection, a prior degreasing as well as breaking of a potential surface oxide layer is helpful. Cold-press welding may particularly be used for sintered first and second magnets.

Further, welding may include friction welding or electric welding. A preferred welding method is capacitor discharge welding. According to an aspect, the welding process may be a solid-state welding process that generates heat through mechanical friction between magnets in relative motion to one another. Thereby, a lateral force may plastically displace and fuse the materials. Thus, friction welding displays a technique combining several advantages as e.g. fast joining times without melting of material but with a direct heat input at the weld interface which yields in small heat-affected zones.

According to a further aspect, the connection is achieved by gluing. Gluing is particularly preferred due to its suitability for cost-effective mass production. The glue or any adhesive may e.g. be applied to the sides of the first and second permanent magnets. The glue may be in a liquid state when applied to the magnets. A maximal temperature of less than 200° C. may be applied to the glue for curing, in particular less or equal 180° C.

The glue further may be provided with an electrically conductive filler. The electrically conductive filler may be used to alter the electrical conductivity of the connection of the first and second magnets. According to a preferred aspect, the filler may comprise electrically conductive metal particles (metal powder) such as Ag particles for increasing the electrical conductivity of the glue.

The filler composition may optionally comprise a mixture of conductive fillers (e.g., Ag particles) and non-conductive fillers for adjusting the electrical conductivity of the joint.

The amount of filler in the glue can be at least 50 wt % and at most 85 wt %. A preferred lower limit is at least 60 wt %, and a preferred upper limit is at most 80 wt %.

The glue may further comprise a binder such as an epoxy- and/or silicone-based binder.

According to a further aspect, the connection of the first and second magnets is achieved by brazing. The brazing filler metal used for brazing may comprise a mixture of conductive filler material and non-conductive filler material to adjust electrical conductivity.

According to an aspect, a frame is provided in which the first and second magnets are fixed. Such frame may for example be a housing or a non-conductive glue that is provided around the first and second magnets. The frame may be combined with any other connection described herein.

Next, aspects relating to the manufacturing method are described.

According to an aspect, the first and second permanent magnets having an R-T-B composition may be provided by any suitable manufacturing method including sintering, hot-pressing, spark plasma sintering and/or 3D printing. The connection of the magnets may be performed after full processing of the individual magnets or it may be combined with the final annealing step of magnet production.

According to a further aspect, a simple and cheap processing route of magnets is provided. For example, no change of magnet production is required with respect to commercial single component magnets that comprise various magnetic properties.

According to an aspect, the connecting step may comprise all the features that are disclosed in combination with the connection itself.

According to an aspect, the connecting step is performed using a connecting medium, the connecting medium being electrically conductive, the connecting medium being at least one element selected from the list consisting of an electrically conductive paste, sheet, foil or glue. According to a further aspect, the connecting step includes gluing, welding, soldering, brazing or arranging of the first and second magnets in a frame.

According to an aspect, the microstructure of the first and second magnets may be essentially preserved. Here, the microstructure is considered to be essentially preserved if no annealing or other microstructure-changing conditions are reached. Furthermore, the term "essentially preserved" is understood such that the microstructure is not changed in the bulk, whereas changes of microstructure on the magnet surface are allowed. Hence, the connection method and/or connective element according to this aspect keeps the microstructure of the permanent magnets, and thereby its bulk magnetic properties, intact.

Additionally, the connecting step further may include heating to a temperature of 200° C. For example, the temperature is required for curing an electrically conductive glue or other temperature associated connecting methods. The connecting step may happen after the first and second magnets have been provided.

Additionally or alternatively, the connecting step may be performed during or after an annealing step of magnet production, the annealing temperature being at least 300° C. and at most 700° C. The term "annealing step" is to be understood as a procedure where magnets are refined to obtain reliable magnetic properties. This may be achieved by a heat treatment. If the connecting step is performed during the annealing step, the microstructure of the magnet may be changed. If the connecting step is combined with an annealing step, a connection between the magnets to be annealed is established e.g. a technique that is suitable for the annealing conditions. Such techniques are described for example in CN 105057827 A.

The magnetic properties of ferromagnetic metals are influenced by several different coupling and interaction-mechanisms (e.g. exchange interaction, crystal anisotropy, magnetostriction etc.) which can directly or indirectly be influenced by a thermal annealing. Conversely the magnetic properties can be reduced by mechanical stresses and in particular plastic deformations. Alloy-specific temperature bandwidths are a first hint, but also shape of the parts, size and mechanical strain is a determining factor for the exact annealing conditions. Further, magnetic annealing may be done after the last step of mechanical treatment. Any further mechanical or thermal impact after the annealing may reduce the magnetic parameters, sometimes considerably.

According to a further aspect, accurate placement of high demagnetization resistance regions is possible. Indeed, finished magnets are much easier to place in a desired arrangement than loose magnetic powders.

In particular, a multicomponent permanent magnet comprises several advantages over a magnet that provides different magnetic properties due to the use of different magnetic powders. For example, a multicomponent magnet comprises a better performance since each component of the multicomponent magnet provides optimal magnetic properties.

Next, aspects relating to the geometry of the multicomponent permanent magnets are described. The first and second permanent magnets may be placed in any arrangement that is suitable for providing the magnets e.g. in an electrical machine. The first and second magnets may depict any geometry that is needed for the intended application.

The size of the first and second magnets may only be limited by the intended application. For example, when arranged in a frame, the size of the first and second magnets may comply with the respective frame size. According to a further aspect, the size of the magnets may be determined by the amount of HRE that is needed to in turn provide the desired magnetic properties. According to one aspect, the dimensions of the multicomponent permanent magnet are 100×100×20 mm. According to a further aspect, the multicomponent permanent magnet comprises a brick-like shape.

According to a further aspect, at least on some sides of the magnet (at least two opposing sides, at least four sides) an outermost layer of second magnets may be provided, i.e., of magnets containing HRE and/or an increased amount of Ce and/or Co. The second magnets of two neighboring sides may contact each other and may be connected by an electrically conductive connection as defined herein.

Next, aspects relating to a possible use of the magnet are described.

According to an aspect, the magnet is used as a permanent magnet in an electrical machine. According to a further aspect, the electrical machine is at least one of an electric motor, a generator, a power transformer, an instrument transformer, a linear motion device, a magnetically biased inductor, and a magnetic actuator. According to an aspect, the electrical machine is a synchronous machine.

The invention claimed is:

1. A multicomponent permanent magnet comprising:
a first permanent magnet having a R-T-B-composition, wherein R is at least one selected from the group consisting of Y, Ce, La, Pr, Nd, Sm, Eu and Gd and T is one or more transition metal elements including Fe;
a second permanent magnet having a R-T-B-composition, wherein R is at least one selected from the group consisting of Y, Ce, La, Pr, Nd, Sm, Eu and Gd and T is one or more transition metal elements including Fe, the second magnet having a higher coercivity than the first magnet;
wherein the first permanent magnet and the second permanent magnet are mechanically connected; and
wherein the first permanent magnet and the second permanent magnet are connected in an electrically conductive manner, wherein
an electrical resistivity $\rho_c$ across a connection between the first permanent magnet and the second permanent magnet in at least one portion of the connection is adjusted to satisfy the following formula:

$$10^{-3}\rho_m \leq \rho_c \leq 10^5 \rho_m,$$

wherein $\rho_m$ is the larger one of the bulk resistivities of the first and second permanent magnets.

2. The multicomponent magnet according to claim 1, wherein the electrical resistivity pc is adjusted to satisfy the following formula:

$$10^{-3} \times 150 \mu\Omega cm \leq \rho_c \leq 10^5 \times 150 \mu\Omega cm.$$

3. The multicomponent magnet according to claim 1, wherein the lower limit of the electrical resistivity $\rho_c$ is $10^{-1} \rho_m$, or is $10^{-1} \times 150$ μΩ cm.

4. The multicomponent magnet according to claim 1, wherein the upper limit of the electrical resistivity $\rho_c$ is $10^3 \rho_m$, or is $10^3 \times 150$ μΩ cm.

5. The multicomponent magnet according to claim 1, wherein the at least one portion of the connection between the first permanent magnet and the second permanent magnet includes an outer edge portion of the connection.

6. The multicomponent magnet according to claim 1, wherein the remanence of the first and second permanent magnets are different from each other.

7. The multicomponent magnet according to claim 1 wherein the R-T-B composition of at least one of the first and the second permanent magnets is a Nd—Fe—B composition.

8. The multicomponent magnet according to claim 1, wherein the second permanent magnet comprises at least one coercivity-increasing element in a higher amount than the first magnet, the at least one coercivity-increasing element preferably including at least one of a heavy rare earth element (HRE), Ce and Co—.

9. The multicomponent magnet according to claim 8, wherein the at least one heavy rare earth element (HRE) of the second permanent magnet comprises at least one of Dy and Tb.

10. The multicomponent magnet according to claim 8, wherein a total content of the at least one heavy earth element (HRE) in the second permanent magnet is between 0.1 and 15 mass %.

11. The multicomponent magnet according to claim 1, wherein the connection between the first and second permanent magnets comprises electrically conductive areas and non-conductive areas, each of the areas connecting respective portions of the first and second permanent magnets to each other.

12. The multicomponent magnet according to claim 1, wherein the connection between the first and second magnets is stable up to a maximum temperature of at least 180° C.

13. The multicomponent magnet according to claim 1, further comprising a third permanent magnet having a R-T-B-composition, the third magnet having a higher coercivity than the second magnet;
wherein the second permanent magnet and the third permanent magnet are mechanically connected; and
wherein the second permanent magnet and the third permanent magnet are connected in an electrically conductive manner.

14. The multicomponent magnet according to claim 1, wherein the connection between the first and the second permanent magnets includes an electrically conductive glue.

15. An electrical machine comprising at least one multicomponent permanent magnet according to claim 1.

16. A method for manufacturing a multicomponent permanent magnet, the method comprising:
providing a first permanent magnet having a R-T-B-composition, wherein R is at least one selected from the group consisting of Y, Ce, La, Pr, Nd, Sm, Eu and Gd and T is one or more transition metal elements including Fe;
providing a second permanent magnet having a R-T-B-composition, wherein R is at least one selected from the group consisting of Y, Ce, La, Pr, Nd, Sm, Eu and Gd and T is one or more transition metal elements including Fe, the second magnet having a higher coercivity than the first magnet;
mechanically connecting the first magnet and the second magnet, wherein the mechanically connecting of the first permanent magnet and the second permanent magnet includes adjusting an electrical resistivity $\rho_c$ across a connection between the first permanent magnet and the second permanent magnet in at least one portion of the connection to satisfy the following formula:

$$10^{-3}\rho_m \leq \rho_c \leq 10^5 \rho_m,$$

wherein $\rho_m$ is the larger one of the bulk resistivities of the first and second permanent magnets.

17. The method according to claim 16, wherein in the mechanically connecting the microstructure of the first and second permanent magnets is essentially preserved.

18. The method according to claim 17, wherein the mechanically connecting includes heating the magnet assembly to a temperature of at most 300° C.

19. The method according to claim 16, wherein the mechanically connecting is carried out in combination with a final annealing step.

20. The method according to claim 16, wherein the electrical resistivity $\rho_c$ is adjusted to satisfy the following formula:

$$10^{-3} \times 150 \mu\Omega cm \leq \rho_c \leq 10^5 \times 150 \mu\Omega cm.$$

21. The method according to claim 16, wherein the lower limit of the electrical resistivity $\rho_c$ is $10^{-1}$ ρm, or is $10^{-1} \times 150$ µΩ cm, and/or wherein the upper limit of the electrical resistivity ρc is $10^3$ ρm, or is $10^3 \times 150$ µΩ cm.

22. The method according to claim 16, wherein the second magnet comprises at least one corecivity-increasing element in a higher amount than the first magnet, the at least one corecivity-increasing element preferably including at least one of a heavy rare earth element (HRE), Ce and Co.

23. The method according to claim 16, wherein the at least one portion of the connection between the first permanent magnet and the second permanent magnet includes an outer edge portion of the connection.

* * * * *